R. L. TAYLOR.
HORSE RELEASER.
APPLICATION FILED JUNE 14, 1910.
981,496.
Patented Jan. 10, 1911.
2 SHEETS—SHEET 1.
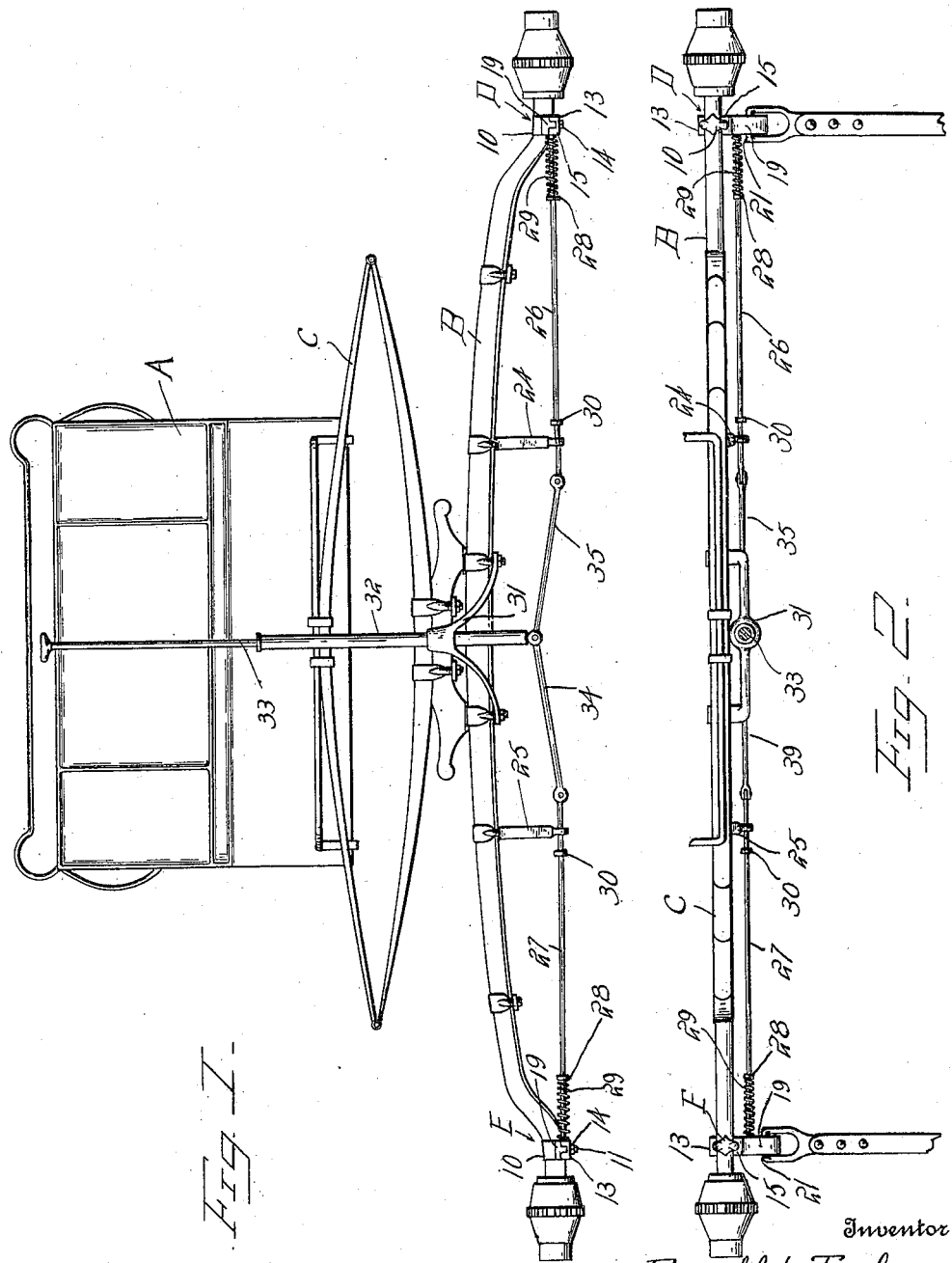
Witnesses
J. C. Simpson
Henry P. Bright
Inventor
Russell L. Taylor
Attorneys

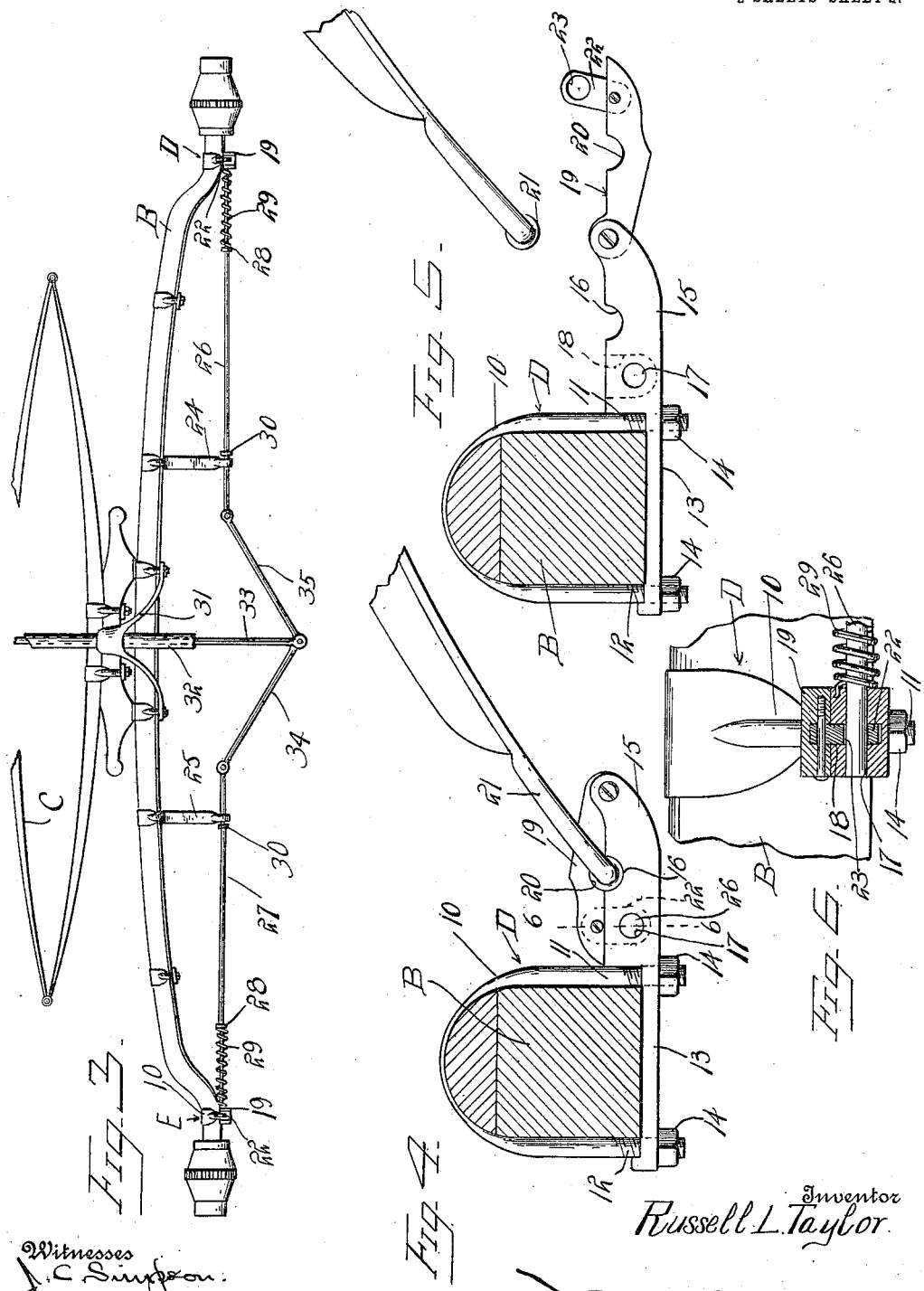

UNITED STATES PATENT OFFICE.

RUSSELL L. TAYLOR, OF FAIR GROUNDS, OREGON.

HORSE-RELEASER.

981,496.

Specification of Letters Patent.  Patented Jan. 10, 1911.

Application filed June 14, 1910.  Serial No. 566,853.

*To all whom it may concern:*

Be it known that I, RUSSELL L. TAYLOR, a citizen of the United States, residing at Fair Grounds, in the county of Marion, State of Oregon, have invented certain new and useful Improvements in Horse-Releasers; and I do hereby declare the following to be a full, clear, and exact description of the invention, such as will enable others skilled in the art to which it appertains to make and use the same.

This invention relates to horse releasers.

The object of the invention is to provide a simple appliance which can be attached to vehicles for the purpose of releasing the shaft or thills whenever the horse becomes unmanageable, thereby permitting the horse to escape without damaging the vehicle or injuring the occupants thereof.

With the above object in view the invention consists in the details of construction and in the arrangement and combination of parts as herein more fully described and particularly pointed out in the appended claim.

In describing the invention in detail reference will be had to the accompanying drawings wherein like characters of reference denote corresponding parts in the several views, and in which, Figure 1 is a front elevation of the body and front axle of a vehicle with the invention associated therewith; Fig. 2, a plan view of the front axle and its associated parts which are illustrated in Fig. 1; Fig. 3, a front elevation of the front axle of a vehicle with the invention shown in released position; Fig. 4, a detail view of one of the couplings in locked position with a thill iron secured thereto; Fig. 5, a view similar to Fig. 4, the coupling being shown in unlocked position and the thill iron detached therefrom; and, Fig. 6, a section on the line 6—6 of Fig. 4.

Referring to the drawings, A indicates generally the body of the vehicle, and B the front axle thereof; said body being supported on the axle by the spring C, in the usual manner. Secured to the axle B at each end thereof are thill couplings D and E and as each of said couplings are identical in every respect only the coupling D will be described in detail. Said coupling D is formed of the usual axle clip 10 which partially encircles the axle B and has its terminals threaded as at 11 and 12; said terminals projecting through suitable apertures in a securing block 13 disposed against one side of the axle and having nuts 14 traveling thereon, whereby the clips are bound to the axle. The securing block 13 is provided with a forward extension 15 which has formed in its upper side a semi-circular recess 16. Said extension is further provided with a bolt receiving aperture 17 and a vertical recess 18 opening through the upper side of the extension and intersecting the bolt receiving aperture 17.

Pivoted to the outer end of the extension 15 is a locking member 19 which has formed therein a semi-circular recess 20 adapted to coöperate with the recess 16 when the member is disposed in locking position to confine the thill iron 21 in said recess. Pivoted on the free end of the locking member 19 is a latch member 22 adapted to be disposed in the recess 18 when the locking member 19 is in locking position; said latch member being provided with an aperture 23 alining with the aperture 17 when the latch member is moved into the recess 18.

Slidingly supported by the axle B through the instrumentality of brackets 24 and 25 respectively are sliding bolts 26 and 27 adapted for coöperation with the couplings D and E respectively. Formed on the stem of the bolt 26 near its outer end is a flange 28 and encircling said bolts with one end bearing against the flange 28 and the other end against the coupling D is a spring 29 through the instrumentality of which the bolt 26 is moved inwardly of the aperture 17 in which it slides so as to pass out of engagement with the latch member 22 and thereby release said latch member 22 and the locking member 19 to the influence of a force exerted upon the thills. Movement of the bolt 26 under the influence of the spring 29 is limited by a flange 30 formed thereon which engages the bracket 24. As the construction of the bolt 27 and its associated parts is identical to the bolt 26 a detail description thereof is omitted.

Secured to the axle B and projecting forwardly therefrom at its center is a bracket 31 which carries a vertically disposed sleeve 32. Slidingly mounted in said sleeve 32 and operable from the body of the vehicle is a rod 33 which has pivotally connected to its lower end oppositely extending links 34 and 35; the link 35 being in turn pivotally connected to the inner end of the bolt 26, while the link 34 is likewise in turn pivotally connected to the inner end of the bolt 27. When the rod 33 is in the position shown in Fig. 1 it has reached the limit of its upward movement and by reason of the link connections 34 and 35 the bolts 26 and 27 are held projected into the couplings D and E respectively against the tendency of their respective springs. The bolts 26 and 27 in this position serve, as will be apparent, to secure the locking members of the couplings D and E against movement to release the thill irons held by the couplings. Should it be desired to release the locking members of the coupling it is only necessary to depress the rod 33 until the lower end of same passes beneath the horizontal plane of the bolts 26 and 27, when said bolts will be released to the influence of their respective springs and moved inwardly out of interlocking engagement with the locking members of the respective couplings. When the bolts are so disposed a force applied to the thills of the vehicle will detach same from the couplings D and E.

What is claimed is:

In a device of the character described, the combination with an axle, of a thill coupling secured to each end of said axle, each of said couplings having a forwardly projecting extension provided with a recess in one edge for receiving a thill iron, said extension being further provided with a bolt receiving aperture and a vertical recess extending through the recessed side thereof and intersecting the bolt receiving aperture, a locking member pivoted to said extension provided with a recess coöperating with the recess of the extension to confine a thill iron in said recesses when the locking member is disposed in locking position, a latch member pivoted to the locking member and disposed in the recess intersecting the bolt aperture of the locking member when the latter is in locking position, said latch member being provided with an aperture alining with the bolt receiving aperture when the latch member is disposed in the last named recess, locking bolts arranged for movement in the alining apertures of each coupling, and means for simultaneously moving said locking bolts into and out of the respective apertures of each coupling.

In testimony whereof, I affix my signature, in presence of two witnesses.

RUSSELL L. TAYLOR.

Witnesses:
A. O. CONDIT,
RUTH C. BOLLIER.